United States Patent
Jaskot et al.

(10) Patent No.: US 12,281,707 B2
(45) Date of Patent: *Apr. 22, 2025

(54) SEALING DEVICE FOR PILLOW BLOCKS

(71) Applicant: ORION ENGINEERED SEALS, LLC, Cincinnati, OH (US)

(72) Inventors: Randall Jaskot, Dousman, WI (US); Todd Brickson, St. Charles, MO (US)

(73) Assignee: ORION ENGINEERED SEALS, LLC, Cincinnati, OH (US)

( * ) Notice: Subject to any disclaimer, the term of this patent is extended or adjusted under 35 U.S.C. 154(b) by 24 days.

This patent is subject to a terminal disclaimer.

(21) Appl. No.: 17/808,638

(22) Filed: Jun. 24, 2022

(65) Prior Publication Data

US 2022/0333647 A1 Oct. 20, 2022

Related U.S. Application Data

(63) Continuation of application No. 16/456,827, filed on Jun. 28, 2019, now Pat. No. 11,371,560.

(60) Provisional application No. 62/691,020, filed on Jun. 28, 2018.

(51) Int. Cl.
| | |
|---|---|
| *F16J 15/44* | (2006.01) |
| *F16J 15/447* | (2006.01) |
| *F16C 33/74* | (2006.01) |
| *F16C 35/02* | (2006.01) |

(52) U.S. Cl.
CPC ............. *F16J 15/447* (2013.01); *F16J 15/44* (2013.01); *F16C 33/74* (2013.01); *F16C 35/02* (2013.01); *F16C 2360/00* (2013.01)

(58) Field of Classification Search
CPC .......... F16J 15/447; F16J 15/44; F16C 33/74; F16C 35/02; F16C 2360/00
See application file for complete search history.

(56) References Cited

U.S. PATENT DOCUMENTS

| | | | | |
|---|---|---|---|---|
| 3,912,342 | A | * 10/1975 | Schirm | F16J 15/441 384/131 |
| 5,335,921 | A | * 8/1994 | Orlowski | F16C 35/047 277/637 |
| 2017/0097046 | A1 | * 4/2017 | Hadden | F16C 35/047 |

* cited by examiner

*Primary Examiner* — Vishal A Patel
(74) *Attorney, Agent, or Firm* — Daniel F. Nesbitt; Nesbitt IP LLC

(57) ABSTRACT

A pillow block bearing seal for sealing the shaft opening around the shaft of a pillow block, having a stator assembly, a rotor, and a resilient cylinder sleeve. The stator assembly has a cylindrical base having an axial length that is configured to accept the shaft passing there through, and a stator extending annularly from an axial end of the cylindrical base. The rotor is configured to attach to and rotate with a rotatable shaft, and has an axially inward-facing surface that confronts the axially outward-facing surface of the stator to define labyrinth interface passage. The resilient cylindrical sleeve is fixed to an outer surface of the cylindrical base for contact with a pair of annular ribs of the bearing housing, for stabilizing the alignment of the center line of the shaft with the bearing housing.

20 Claims, 10 Drawing Sheets

SEALING DEVICE FOR PILLOW BLOCKS

CROSS-REFERENCE TO RELATED APPLICATION

This application is a continuation of U.S. application Ser. No. 16/456,827 filed Jun. 28, 2019, which claims the benefit of U.S. Provisional Application 62/691,020, filed Jun. 28, 2018, the disclosures of which are hereby incorporated by reference in their entireties.

BACKGROUND OF THE INVENTION

Industry has long used self-contained bearing and housing units designed to support heavy rotating shafts supported rotatively by bearings. These bearing units require adequate lubrication for the bearings. The lubrication must be retained in the housing unit and in addition, contaminants such as debris, dirt, etc. must be kept out of the housing unit, out of the lubrication, and away from the bearing in order to ensure smooth operation. These self-contained units are commonly known as pillow blocks and/or plumber blocks. The types and sizes cover virtually all applications that employ the use of heavy, and sometimes long, shafts in equipment such as road building, conveyors, fans, etc.

The normal, severe duty, pillow block is horizontally split, and the top half can be removed for convenient inspection and installation of the shaft, bearings, and seals. In the prior art, there have been many different systems for sealing split pillow blocks including lip seals, springs, V-rings, felt, grease pockets and relatively rotating rings forming a labyrinth seal sometimes called a disc pack or taconite seal.

The present invention provides an improved pillow block seal that is easier to install and maintain, and is very effective at sealing the bearings of the pillow block from contamination.

Adequate maintenance of rotating equipment is difficult to obtain because of extreme equipment duty cycles, the lessening of service factors, design and the lack of spare rotating equipment in many processing plants. This is especially true of process pumps, slurry pumps, machine tool spindles, wet end paper machine rolls, aluminum rolling mills and steam quench pumps and other equipment utilizing extreme contamination that can affect lubrication of the bearings of the rotating equipment.

Various forms of shaft sealing devices have been utilized to try to protect the integrity of the bearing environment, including rubber lip seals, clearance labyrinth seals, and attraction magnetic seals. Lip seals or O-ring shaft seals can quickly wear out and fail and are also known to permit excessive amounts of moisture and other contaminants to migrate into the lubricant (oil or grease) reservoir of the operating equipment even before failure had the interface between the rotor and the stator exposed to the contaminates or lubricants at the radial extremity of the seal.

Labyrinth-type seals involving closely related stator and rotor rings, which do not contact each other but define labyrinth passages between them have been devised and utilized and are illustrated in U.S. Pat. Nos. 4,706,968, 4,989,883, 5,069,461, and 6,419,233, the disclosures of which are incorporated by reference in their entireties.

SUMMARY OF THE INVENTION

In an embodiment of the invention, a pillow block bearing seal is provided, and configured for mounting into a shaft opening in a wall of a bearing housing that is defined by a pair of axially-spaced annular ribs separated by a groove, for sealing the shaft opening around the shaft. The pillow block bearing seal comprises a stator assembly, a rotor and a resilient cylinder sleeve. The stator assembly includes a cylindrical base having an axial length that is configured to accept the shaft passing there through, and a stator extending annularly from a first axial end of the cylindrical base, the stator including an axially outward-facing surface. The rotor is configured to attach to and rotate with a rotatable shaft, and has an axially inward-facing surface that confronts the axially outward-facing surface of the stator to define labyrinth interface passage. The resilient cylindrical sleeve is fixed to an outer surface of the cylindrical base, and configured for contact with the pair of annular ribs of the bearing housing, for stabilizing the alignment of the center line of the shaft with the bearing housing.

In another embodiment of the invention, a pillow block sealed bearing housing is provided for a rotating shaft. The sealed bearing housing includes a bearing housing having a wall with a shaft opening defined by a pair of axially-spaced annular ribs separated by a groove, and a shaft generally supported by one or more bearings in the bearing housing. The sealed bearing housing also includes a pillow block bearing seal that comprises a stator assembly mounting into the shaft opening in the wall of the bearing housing, the stator assembly including a cylindrical base having an axial length that is configured to accept the shaft passing there through, and a stator extending annularly from a first axial end of the cylindrical base, the stator including an axially outward-facing surface. The pillow block bearing seal also includes a rotor configured to attach to and rotate with a rotatable shaft, the rotor having an axially inward-facing surface that confronts the axially outward-facing surface of the stator when the rotor is fixed to the stator, to provide a labyrinth seal having a labyrinth interface passage, and a resilient cylindrical sleeve fixed to an outer surface of the cylindrical base, and configured for contact with the pair of annular ribs of the bearing housing, for stabilizing the alignment of the center line of the shaft with the bearing housing.

In a further embodiment, the bearing seal also includes at least two alignment elements axially displaced and positioned radially within inner annular grooves on an inside surface of the cylindrical base, and configured to have a zero contact clearance with the shaft. The alignment elements can be made of a material having low coefficient of friction, that conform to the surface of the shaft by being worn away by the rotation of the shaft, and are made of Teflon®.

In a further embodiment, the bearing housing is a split bearing housing that includes a split wall and a means for securing together the two halves of the split bearing housing, and each split wall includes a semi-circular portion of the pair of axially-spaced annular ribs of the bearing housing. When the two halves of the split bearing housing are tightened securely to each other, the invention provides a fixed axial position and fixed radial alignment for the seal, and permits slight angular misalignment of the housing with respect to the bearing seal and the shaft.

In a further embodiment, the stator of the bearing seal is pinned to the bearing housing. The stator has a first pinning bore, and the bearing housing has a second pinning bore, and an elongated pin is disposed within both of the first pinning bore and second pinning bore, to prevent rotation of the stator with the rotating shaft, and to fix the stator rotatively with the bearing housing. In one embodiment, the first pinning bore is formed axially in a rearwardly-facing radial wall of the stator, and the second pinning bore is formed axially in a forwardly-facing radial portion of the wall of the bearing housing. In another embodiment, the first pinning bore is formed radially in the cylindrical base of the stator assembly, and the second pinning bore is formed radially into the wall of the bearing housing, and aligned with the groove between the pair of annular ribs.

In a further embodiment, the rotor and stator assembly have a split configuration.

The advantage of the present invention is that the bearing seal is easier to install, and requires only alignment of the pair of ribs with the cylindrical sleeve to ensure a secure seal and alignment with the bearing housing.

The bearing seal can comprise a labyrinth seal having a labyrinth pathway formed between the confronting surfaces of the stator and rotor. In one embodiment, the labyrinth pathway has a radially-outermost annular interface between the stator and the rotor that defines the initial distal entry point of liquid or vapor contaminant into the seal. The exit out of the pathway of the radially-outermost interface is directed radially outward to promote expulsion of contaminant that encroaches into the interface during dynamic operation of the seal. In another embodiment, the radially-outermost annular interface passage is formed between an annular, outermost, radially-extending projection of the stator, and an annular rearwardly-extending distal projection of the rotor that includes an annular inner surface that overlaps the radially-extending projection of the stator, the radially-outermost annular interface passage tapering outwardly and rearwardly at an angle relative to an axial reference line.

In another embodiment, the labyrinth pathway has a first exclusion chamber defined in part by a radially-inboard projection of the rotor, for expelling contaminant liquid outward radially, to enhance sealing performance. In another embodiment, the first exclusion chamber is an outer exclusion chamber that extends radially, and is defined between the radially-inboard projection and the annular rearwardly-extending distal projection of the rotor.

In a further embodiment, the labyrinth pathway also has a second exclusion chamber, comprising radially-inside exclusion chamber, disposed radially inboard of the first exclusion chamber.

In another embodiment, the labyrinth seal includes a contact avoidance interface between the stator and the rotor that is positioned in an intermediate portion of the labyrinth pathway, which is inboard of at least two contaminant-excluding interfaces, and optionally is inboard of at least one exclusion chamber. This feature ensures that any wear associated with dynamic contact of the rotor with the stator does not damage the important excluding interfaces.

In another embodiment, the bearing seal when configured for oil lubrication includes a stator assembly having a lubricant collecting groove disposed rearwardly from the cylinder base, and having a radially tapered interior surface that improves the flow of lubricant through a drain in the bottom of the stator assembly, back to a lubrication sump of the bearing housing.

DETAILED DESCRIPTION OF THE INVENTION

Figure 1:
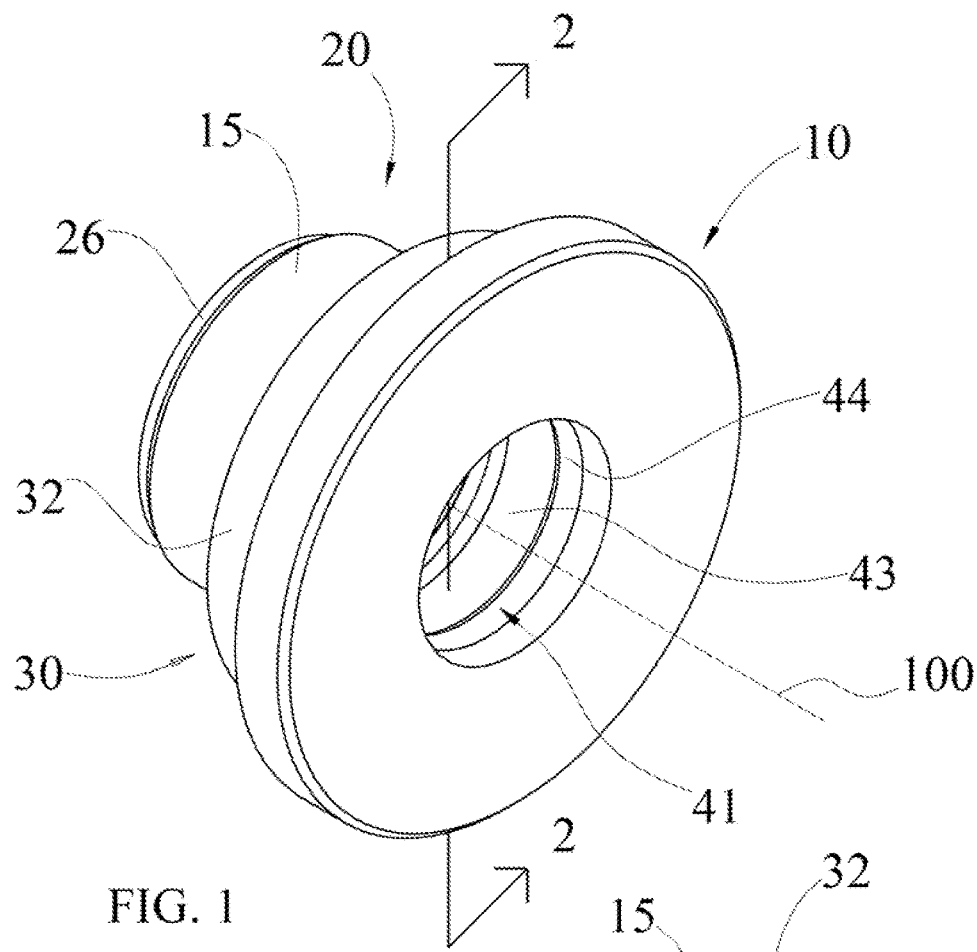
FIG. 1 shows a perspective view of a bearing seal, suitable for grease lubrication.
Figure 2:
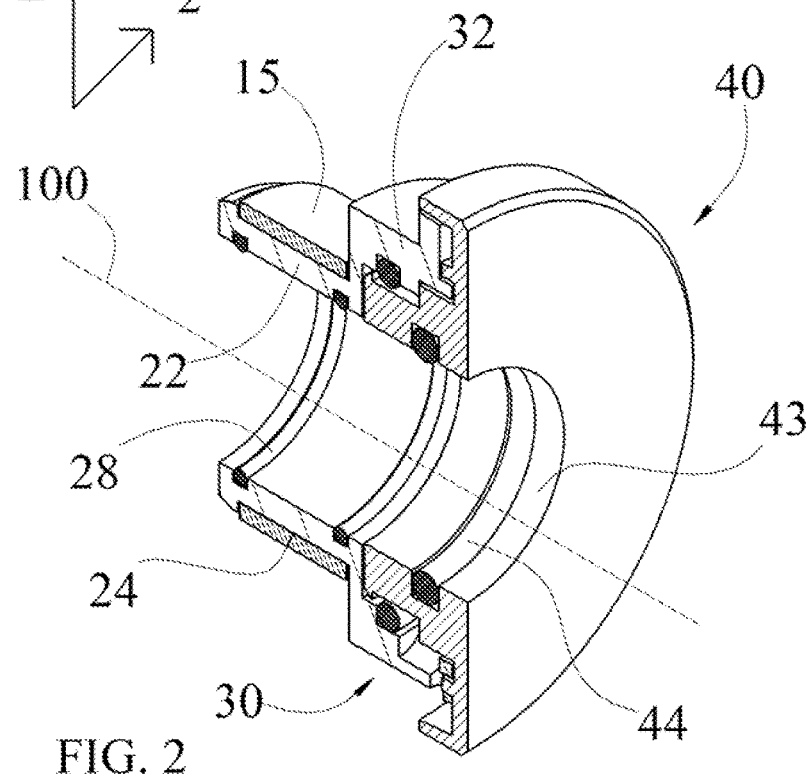
FIG. 2 shows a section view of the bearing seal of FIG. 1, through line 2-2.

The normal pillow block and its operation with a shaft, a bearing and a seal is shown and described in U.S. Pat. No. 5,335,921 and in International Publication WO98/02669, the disclosures of which are incorporated herein by reference. The bearing seals of the present invention are designed and configured for use in pillow block bearing housings. As described in the prior art, and illustrated in FIG. 5, a typical pillow block bearing housing includes a housing body 80 that is typically split into two pals along a horizontal plane, into a top housing body 80*a* and a lower housing body 80*b*. A side wall 81 of the housing body 80, including an upper side wall 81*a* and lower side wall 81*b*, has a shaft opening 82 that is defined by a pair of annular ribs 83 and 84, and is configured to accommodate a rotating shaft 90 passing there through.

FIGS. 1 through 4 show a pillow block bearing seal 10 according to the present invention. The illustrated bearing seal 10 is configured to use grease lubrication, with a grease fitting (not shown), as is well known. The bearing seal 10 includes a stator assembly 30 and a rotor 40. The stator assembly 30 includes a cylinder base 22 and a stator 32.

Figure 4:
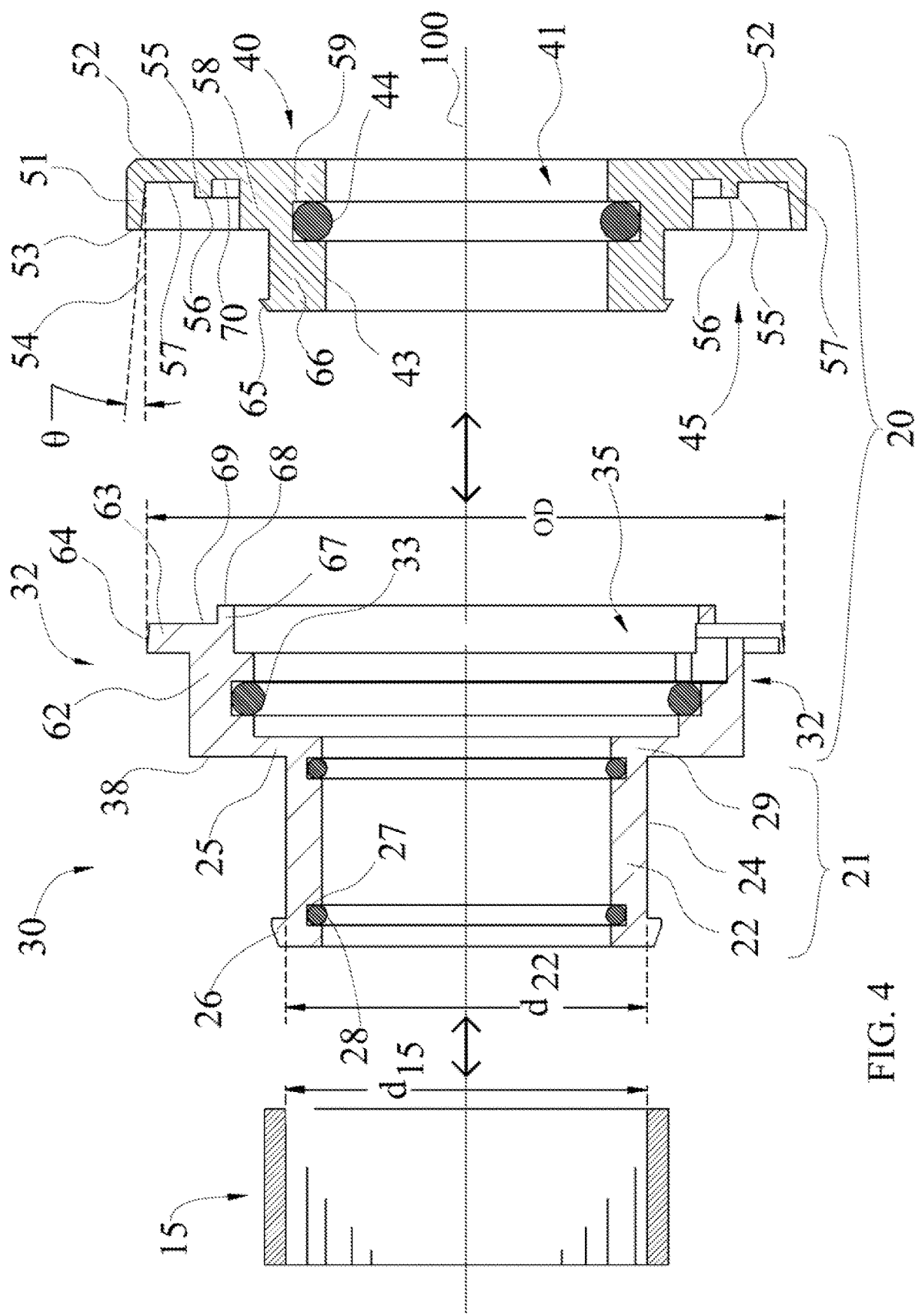
FIG. 4 shows an elevation section view of the bearing seal of FIG. 3, with the elements including a stator assembly, a rotor, and a resilient cylindrical sleeve, axially exploded.

As shown in FIG. 4, the bearing seal 10 consists functionally of a seal mechanism 20, and a seal carrier and alignment mechanism 21. The seal mechanism 20 includes the rotor 40 and the stator 32 that are engaged and fixed together to prevent axial movement of the rotor 40 relative to the stator 32. The seal carrier and alignment mechanism 21 consists of the cylinder base 22. The stator 32 extends from, and is fixed to, one end of the cylinder base 22 to prevent axial and radial movement of the stator 32 and the seal mechanism 20 from the seal carrier and alignment mechanism 21 and the cylindrical base 22. In the embodiment as illustrated, cylinder base 22 and the stator 32 are formed as a unitary stator assembly 30. In an alternative embodiment, cylinder base 22 can be a separate element from the stator 32, which is rigidly secured to an end of the cylindrical base 22.

The rotor 40 has a central bore 41 sized to receive the shaft 90. A rotor sealing device, illustrated as an o-ring 44, is positioned within a groove 59 (FIG. 4) on the inner surface 43 of the shaft bore 41, which seals the rotor 40 around the outside surface 91 of the shaft 90, and also services as a rotor drive means to cause rotation of the rotor 40 when the shaft 90 is driven rotatively.

A stator sealing device, illustrated as an o-ring 33, is disposed into a groove of the stator 32, and retains axially the rotor 40 with the stator assembly 30 when assembled face-to-face to form the labyrinth seal.

Figure 5:
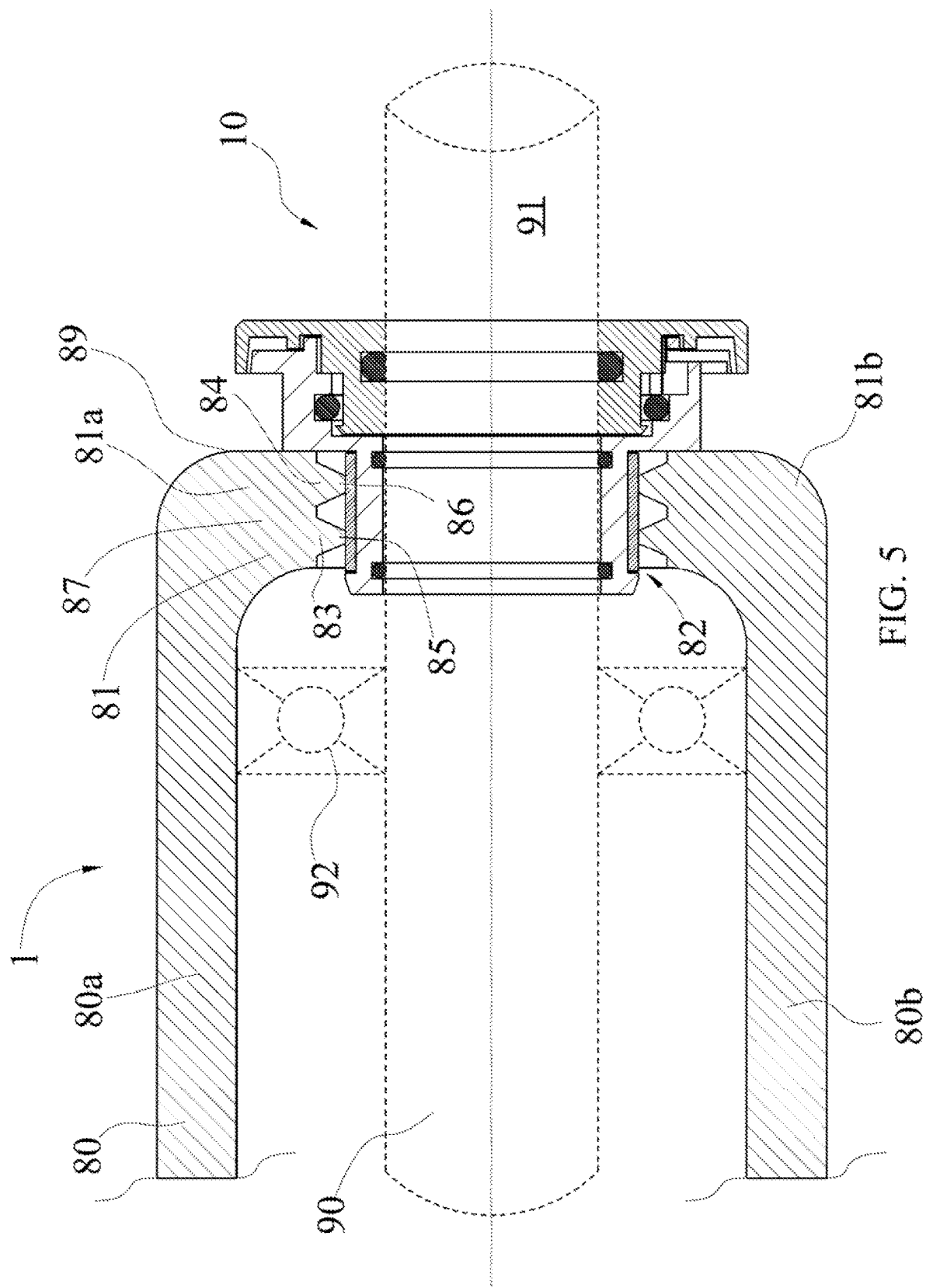
FIG. 5 shows a section view of a sealed bearing housing having the bearing seal of FIG. 3 assembled on a shaft within a bearing housing and supported by a bearing.

The seal carrier and alignment mechanism 21 comprising the cylindrical base 22 provides alignment of the seal mechanism 20 radially and angularly with the center line 10 of the shaft 90, and with the housing body 80 to form a sealed bearing housing 1 as shown in FIG. 5. The cylindrical base 22 comprises a rigid or highly resilient material. The cylindrical base 22 is positioned so that the internal surface 23 fits non-contactingly around the outer surface 91 of the shaft 90. A pair of aligning and positioning elements, illustrated as annular alignment rings 28, are fitted into a pair of annular, spaced-apart grooves 27 in the inner surface 23 of the cylindrical base 22, to engage on the outer surface 91 of the shaft 90. The alignment rings 28 can be made of Teflon® or some other sublimable or erodible sacrificial material, which are firmly abutted, when initially installed, against the outer surface 91 of the shaft 90. The alignment rings 28 are sacrificed by being slightly worn away or sublimated when the shaft 90 is rotated. Thus, the radial alignment is maintained because the wearing action ceases as soon as there is zero contact between the alignment rings 28 and shaft 90.

A resilient cylindrical sleeve 15 is retained on an outer surface 24 of the cylindrical base 22. The cylindrical sleeve 15 is prevented from movement axially at the proximal end 29 of the cylindrical base 22 by a radial-extending neck member 25 that defines a radial surface 38, and at the opposite distal end by an annular radial shoulder 26. The resilient cylindrical sleeve 15 can be made deformable material, which can include, as non-limiting examples, rubber, natural rubber, and butyl rubber. The inner diameter d15 of the resilient cylindrical sleeve 15 is typically the same as or slightly smaller than the outer diameter d22 of the cylindrical base 22. The radial thickness of the resilient cylindrical sleeve 15 is typically greater than the height of the shoulder 26 from the outer surface 24 of the cylindrical base 22, and can be provided with any thickness sufficient to engage and stabilize the stator assembly 30 within the housing opening 82.

As shown in FIG. 5, the seal mechanism 20 is axially fixed with respect to the shaft 90 by the alignment of the cylindrical base 22 and resilient cylindrical sleeve 15 with the shaft opening 82 of the housing body 80. The housing body 80 includes an outer wall 81 having the shaft opening 82 defined by a pair of annular ribs 83 and 84. The ribs 83, 84 are axially spaced apart and separated by a groove 87. The distal ends 85 and 86 of the ribs 83, 84, respectively, engage the resilient cylindrical sleeve 15 when assembled, to prevent axial, angular and radial movement of the stator assembly 30 relative to the housing body 80. The material of the resilient cylindrical sleeve 15 will deform and be displaced by the distal ends 85, 86 of the annular ribs 83, 84 to maintain alignment of the housing body 80 with the shaft 90, the stator assembly 30, and the bearings 92. While deformable, the material is not spongy or flexible, and is configured to be deformed without memory, so that once the pillow block is secured, the alignment is maintained. Typically, if the pillow blocks and/or the bearings should be removed, the resilient cylindrical sleeve 15 is replaced prior to reassembly.

Figure 6:
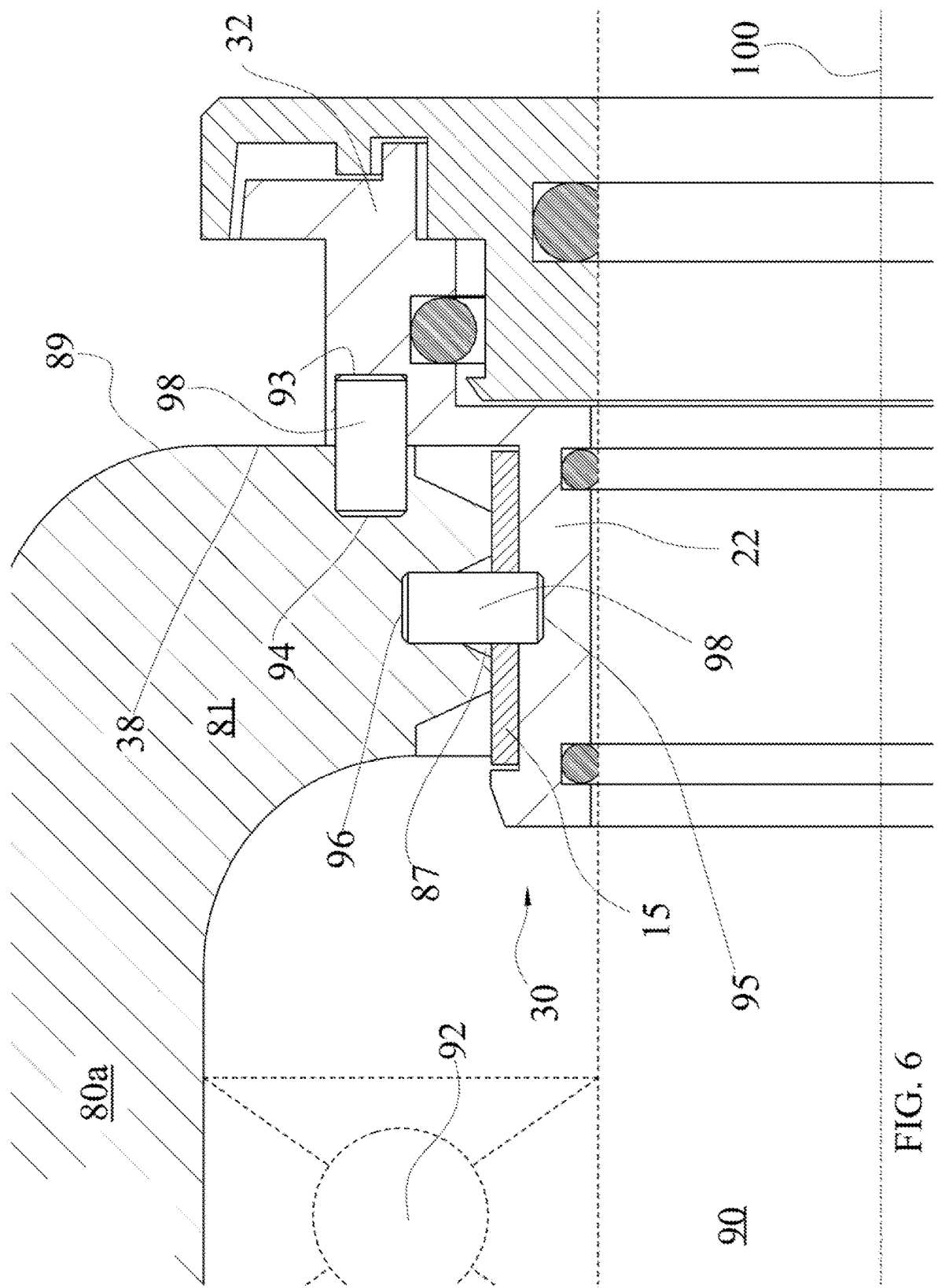
FIG. 6 shows the sealed bearing housing of FIG. 5, with the stator assembly pinned to the bearing housing.

FIG. 6 illustrates an embodiment of the invention wherein the stator assembly is secured by pinning the stator assembly to the housing bod. One embodiment for pinning the stator assembly 30 to the housing body 80 provides for forming a first pinning bore 93 into a rearwardly-facing radial surface 38 of the stator 32, the first pinning bore 93 extending axially and partly into the radial surface 38. A second pinning bore 94 is formed into a forwardly-facing surface 89 of the wall 81 of the housing body 80, the second pinning bore 94 extending axially and partly into the wall 81. The first and second pinning bores 93 and 94 are formed at the same radial distance from the shaft axis 100, and can be placed into angular alignment by rotating the stator assembly 30, and thus the stator 32, about the shaft 90. With the rotor 40 and stator assembly 30 spaced axially apart, with the first and second pinning bores 93 and 94 axially and angularly aligned, a cylindrical pin 98 is placed into either of the first and second pinning bores 93 and 94, and the stator assembly 30 is moved down the shaft into or proximate to contact with the wall 81 so that the pin 98 extends into both the first and second pinning bores 93 and 94, to pin the stator 32 to the wall 81, thereby preventing rotation of the stator assembly 30 relative to the housing body 80.

In another and alternative embodiment for pinning, a first pinning bore 95 is formed radially into the outer surface 24 of the cylindrical base 22, and through the resilient cylindrical sleeve 15, and a second pinning bore 96 is formed radially into the wall 81 of the housing body 80, aligned within the groove 87 and axially and angularly aligned with the first pinning bore 95. In this embodiment, the stator assembly 30 is positioned in the half portion of the shaft opening of the lower pillow block housing member 80b, with the first pinning bore 95 directed vertically and transverse to the axial centerline 100. After the cylindrical pin 98 is placed into the first pinning bore 95, and the upper pillow block housing body 80a is positioned in alignment over the lower pillow block housing body 80b, securing the stator assembly 30 within the shaft opening 82 and trapping the pin 98 within both the first and second pinning bores 95 and 96, thereby preventing rotation of the stator assembly 30 relative to the housing body 80.

Figure 7:
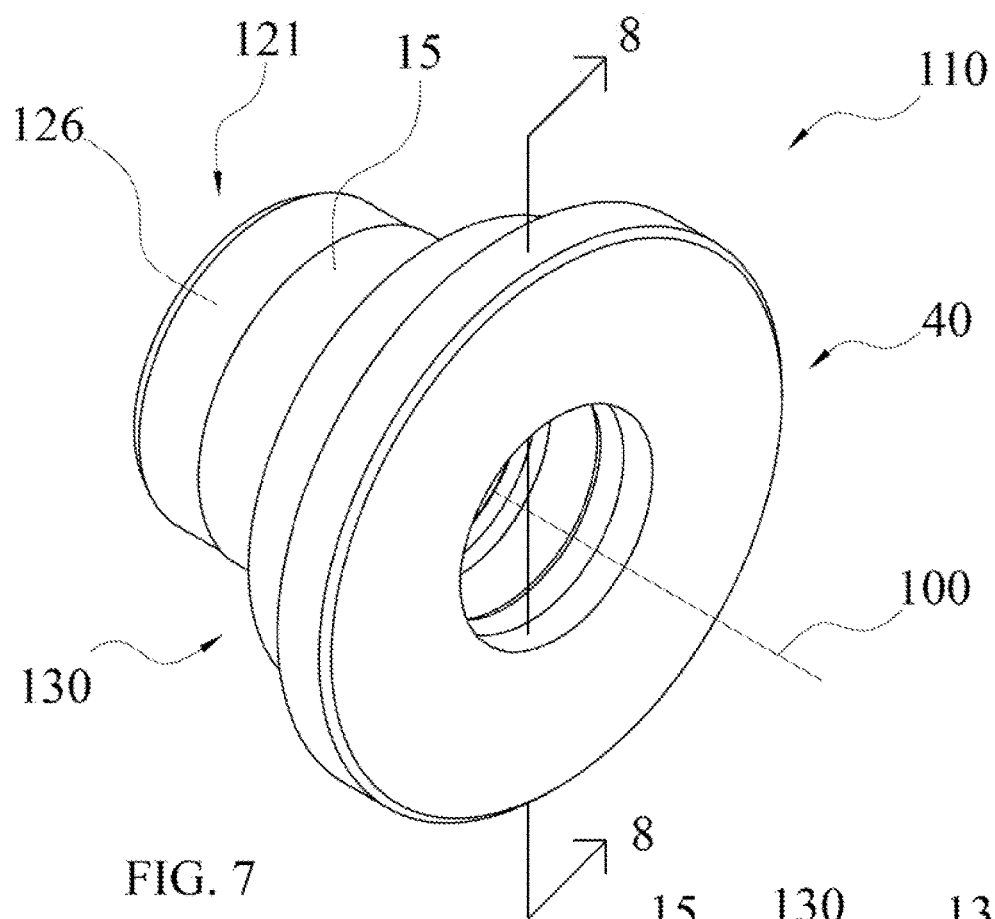
FIG. 7 shows a perspective view of an alternative bearing seal, suitable for oil lubrication.
Figure 8:
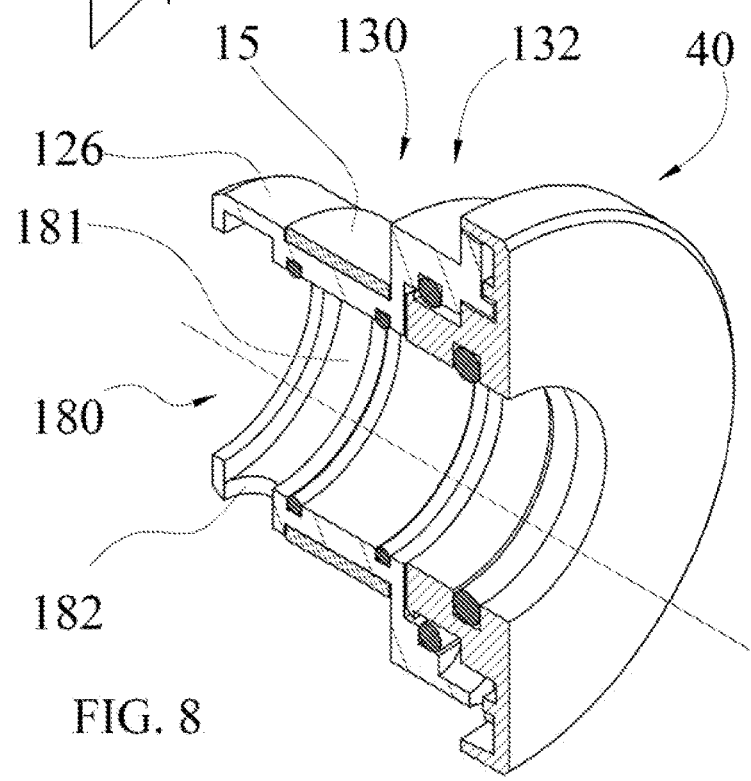
FIG. 8 shows a section view of the bearing seal of FIG. 7, through line 8-8.
Figure 9:
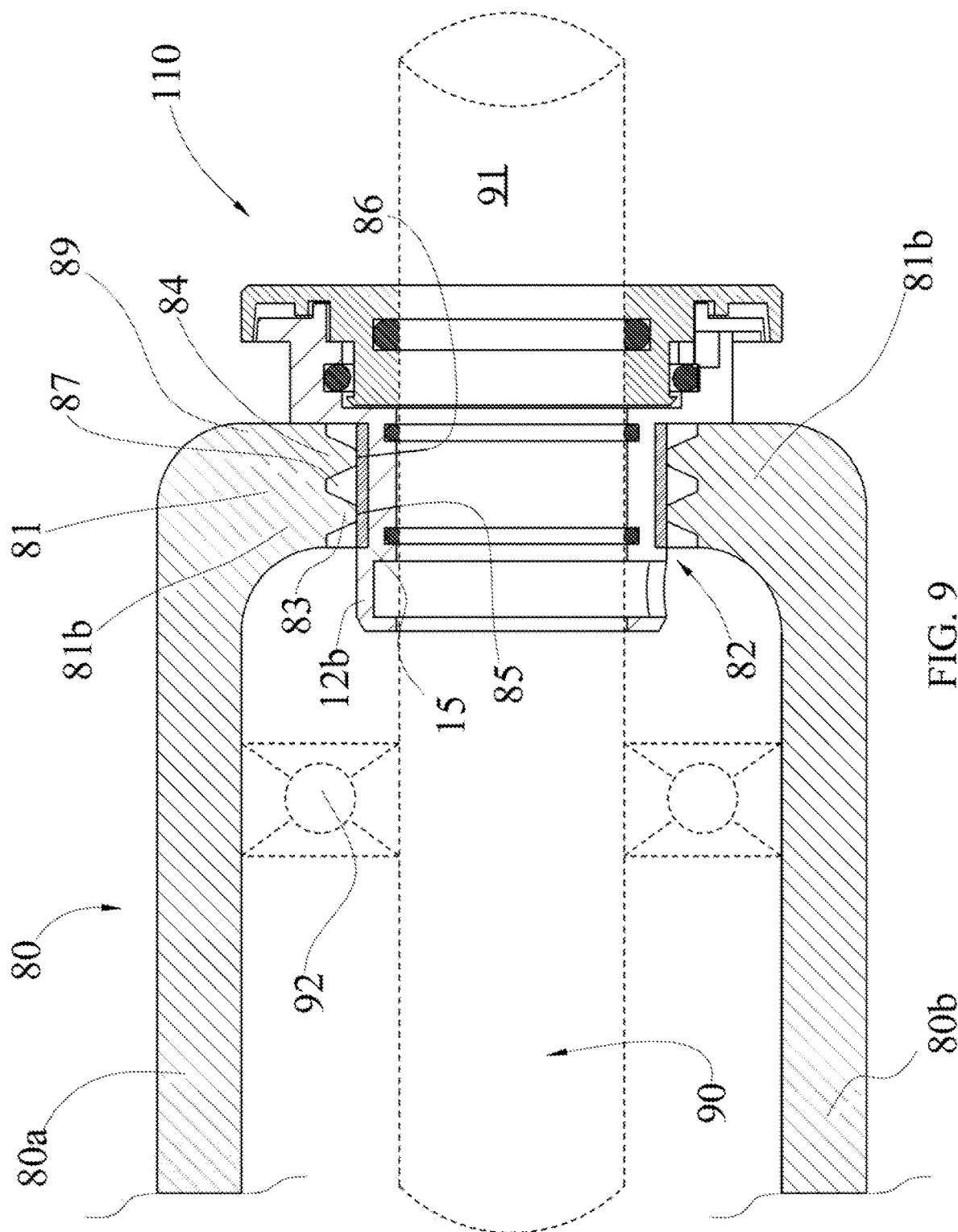
FIG. 9 shows a sectional view of a sealed bearing housing having the bearing seal of FIG. 7 assembled on a shaft within a bearing housing and supported by a bearing.

FIGS. 7-9 illustrate another embodiment of a bearing seal 110 according to the present invention that is configured for oil lubrication, by a well-known means. In the illustrated embodiment, the seal carrier and alignment mechanism 121 includes a distally-extending cylinder 126 with a distal opening 180 for the shaft 90, and an oil collection groove 181 in an inner surface of the distally-extending cylinder 126, with a drain opening 182 disposed at the vertical bottom for draining and collecting lubricating oil back into a sump of the housing body 80.

Figure 10:
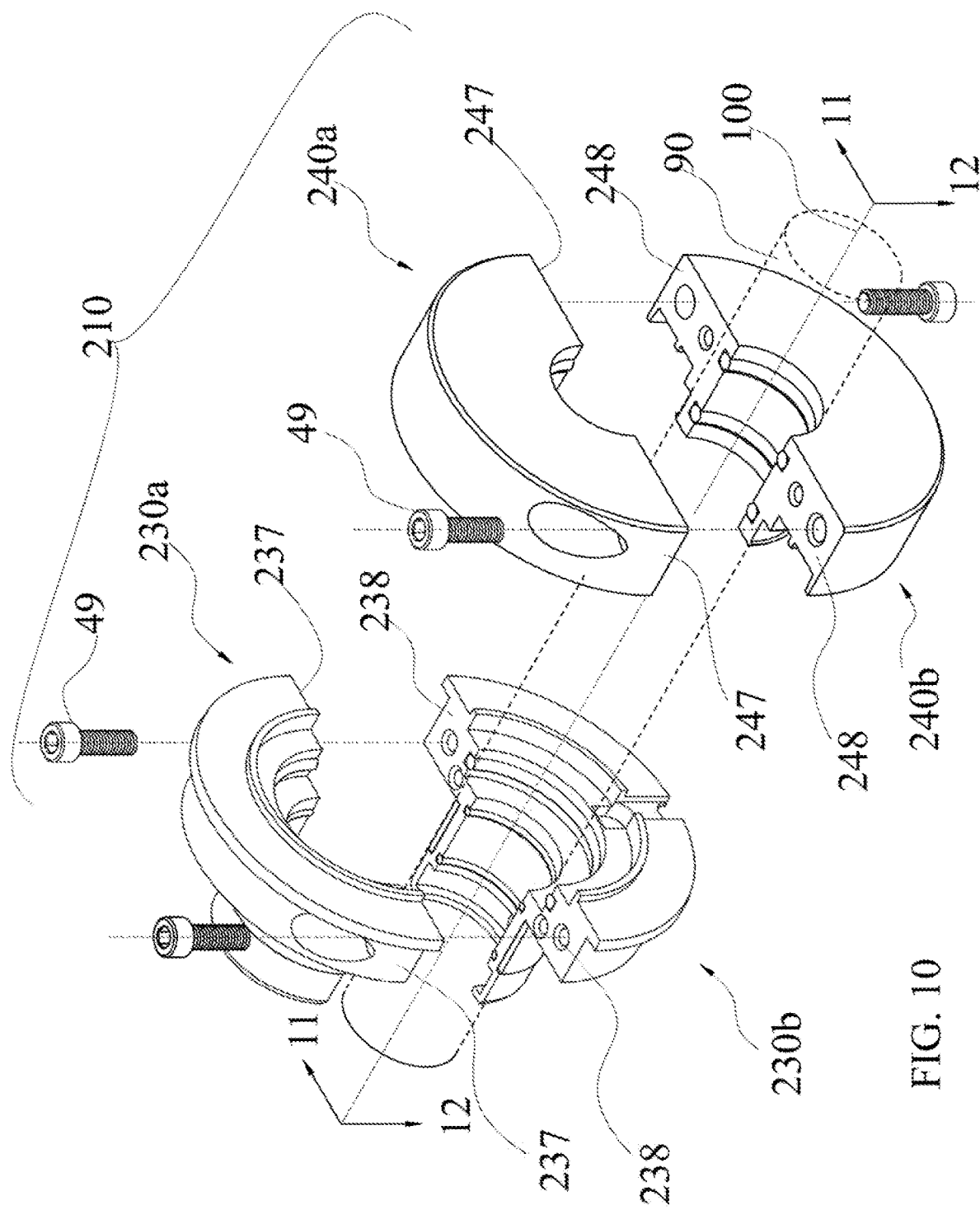
FIG. 10 shows a modification of the bearing seal of FIG. 7, having a split configuration.
Figure 11:
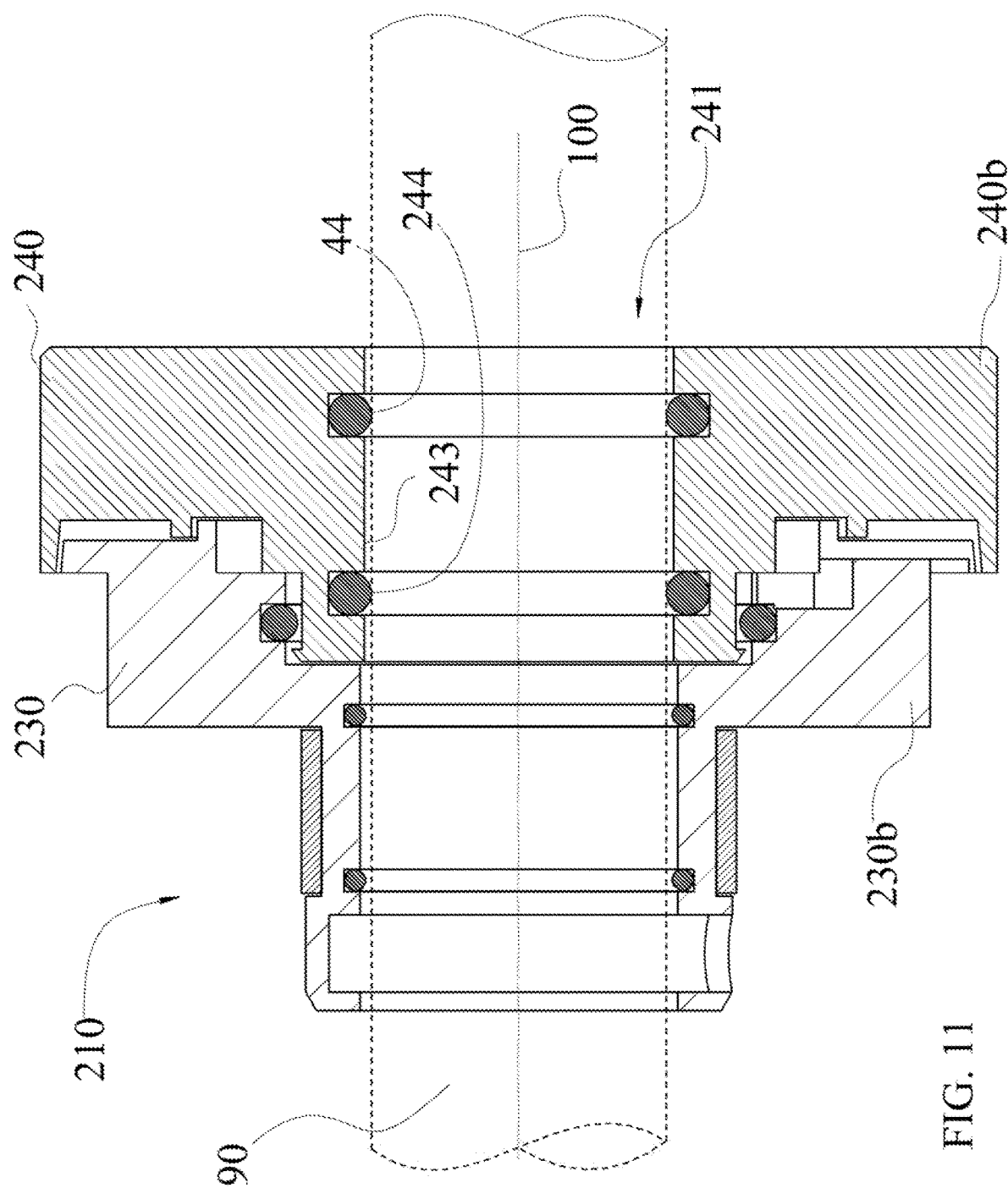
FIG. 11 shows an elevation section view of the bearing seal of FIG. 10, through line 11-11 of FIG. 10.
Figure 12:
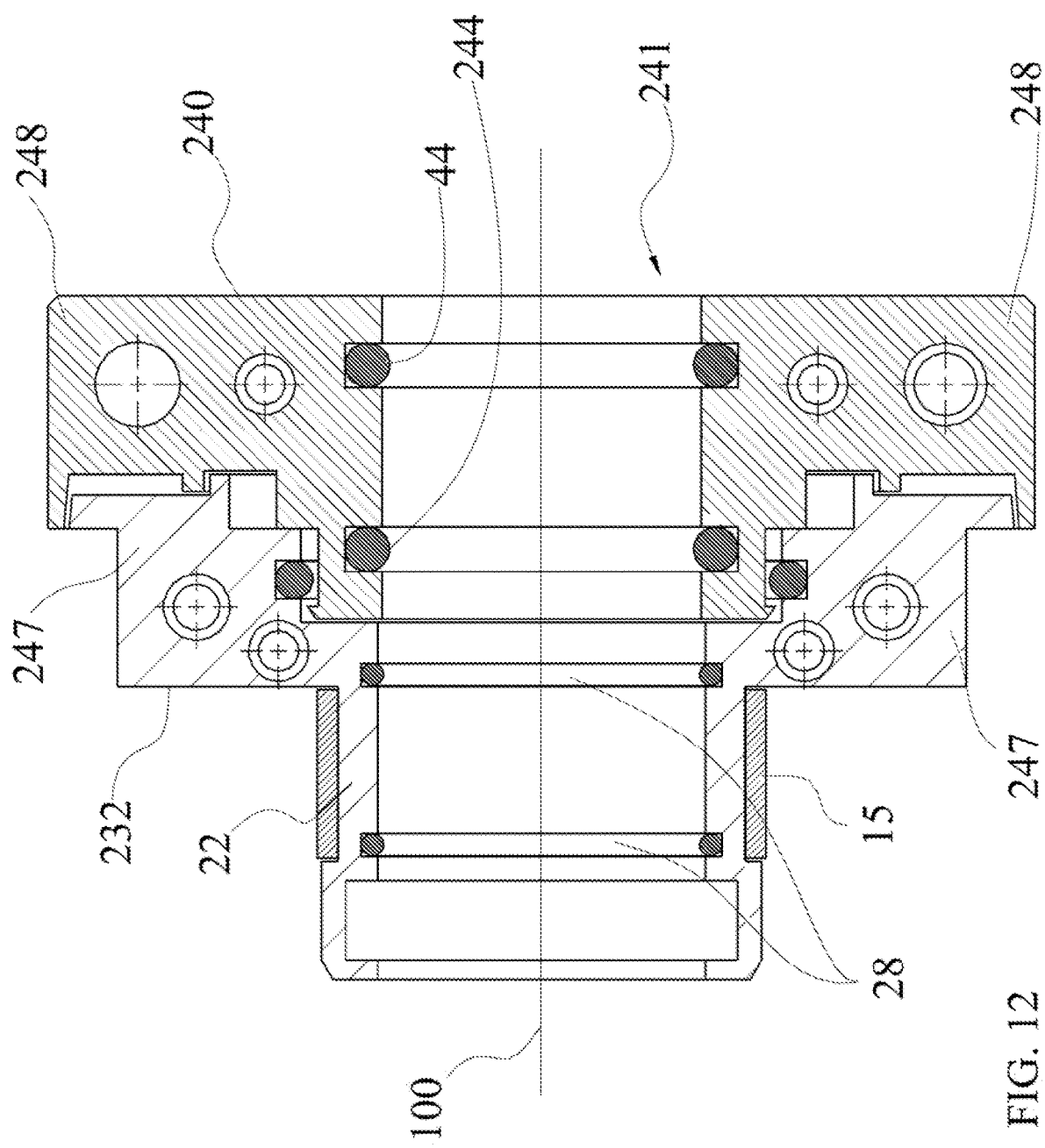
FIG. 12 shows a plan section view of the bearing seal of FIG. 10, through line 12-12 of FIG. 10.

The present invention also provides that the rotor and the seal assembly can have a split configuration, as illustrated in FIGS. 10 and 11. The illustrated embodiment of a split-configuration bearing seal 210 is functionally similar to the embodiment of the bearing seal 110 shown in FIGS. 7-9, which is configured for oil lubrication. Alternatively, the split-configuration bearing seal can be configured for grease lubrication, similarly to the embodiment of bearing seal shown in FIG. 1. FIG. 10 shows that the rotor 40 and seal assembly 30 are made in two opposing and symmetrical halves, shown as rotor halves 240a and 240b, and stator assembly halves 230a and 230b, on opposite sides of the axial centerline 100. Flanges 237 of the upper stator assembly half 230a are then secured to the flanges 238 of the lower stator assembly half 230b, and flanges 247 of the upper rotor half 240a are then secured to the flanges 248 of the lower rotor half 240b, with fasteners, for example and as illustrated, bolts 49. The plan sectional view of FIG. 1 shows that to accommodate the flanges and bolts, the diameters of the stator assembly 230 and the rotor 240 are enlarged, and the axial thickness of the rotor 240 is increased. A second o-ring 244 is provided on the inner surface 243 of the shaft bore 241 to stabilize and balance the rotor 240 on the shaft 90.

Returning to FIG. 4, the forward-facing surface 35 of the stator 32 in a confronting assembled position with the rearward-facing surface 45 of the rotor 40 provide a labyrinth pathway there between, extending radially from the inner surface 43, proximate the shaft 90, to an outer diameter (OD) edge. The rotor 40 includes a first annular distal projection 51 extending rearwardly from the forward wall 52 to a distal end 53. The annular distal projection 51 has an inner annular surface 54 that tapers outwardly and rearwardly at angle θ relative to the axial centerline 100. The inner annular surface 54 is typically a machined, frustoconical-shaped annular surface having an acute angle θ of at least 1°, more typically at least 2°, more so typically at least 3°, and up to 45°, typically up to 15°, more typically up to 10°, and more so typically up to 5°.

The rotor 40 also includes a second intermediate annular projection 55 that extends rearwardly to a distal end 56 that extends substantially parallel to the axial centerline 100. The second intermediate projection 55 with the distal projection 51 define there between an outer channel surface 57 on the forward wall 52. An inside surface of the forward wall 52 disposed radially inwardly from the second intermediate projection 55 defines an inner channel surface 70.

The rotor 40 also includes a third proximal annular projection 66 that extends rearwardly from a main body portion 58 of the rotor 40, and includes at a rearward end a catch 65 that extends radially outwardly to engage the o-ring 33 of the stator 32, to provide the means for locking the rotor 40 in operational association with the stator 32.

The stator 32 includes axially- and radially-extending projections extending from the neck 25 of the stator assembly 30 to form the forward-facing interface surface 35 that defines cavities and interfaces with the confronting interface surface 45 of the rotor 40. A forward portion 62 of the stator 32 extends both radially and axially from the neck 25, and includes an annular, outermost, radially-extending projection 63 having a tapered, machined, annular distal edge 64. The distal edge 64 is typically a frustoconical-shaped annular surface having the acute angle θ relative to the axial centerline 100, sloped axially forward and radially inward. When the rotor 40 is operationally associated with the stator 32, the inner surface 54 of the rotor's distal projection 51 overlaps the outermost distal edge 63 of the stator 32 to define a tapered annular interface passage 65. This tapered interface passage defines the initial entry point of a liquid contaminant into the seal between the distal edge of the rotating rotor and the stationary stator. The exit out of the interface passage is directed radially outward to promote expulsion of contaminant that encroaches into the interface during dynamic operation of the seal.

The forward portion of the stator body 62 has a machined, radial surface 69, and includes an axially forward projection 67 having a machined distal end 68. When the rotor 40 is operationally associated with the stator 32, the machined distal end 56 of the intermediate projection 55 of the rotor 40 forms a first radially-extending interface passage with the radial surface 69 of the stator 32, while the distal end 68 of the projection 67 of the stator 32 forms a second radially-extending interface passage with the inner channel surface 70 of the rotor 40.

Figure 3:
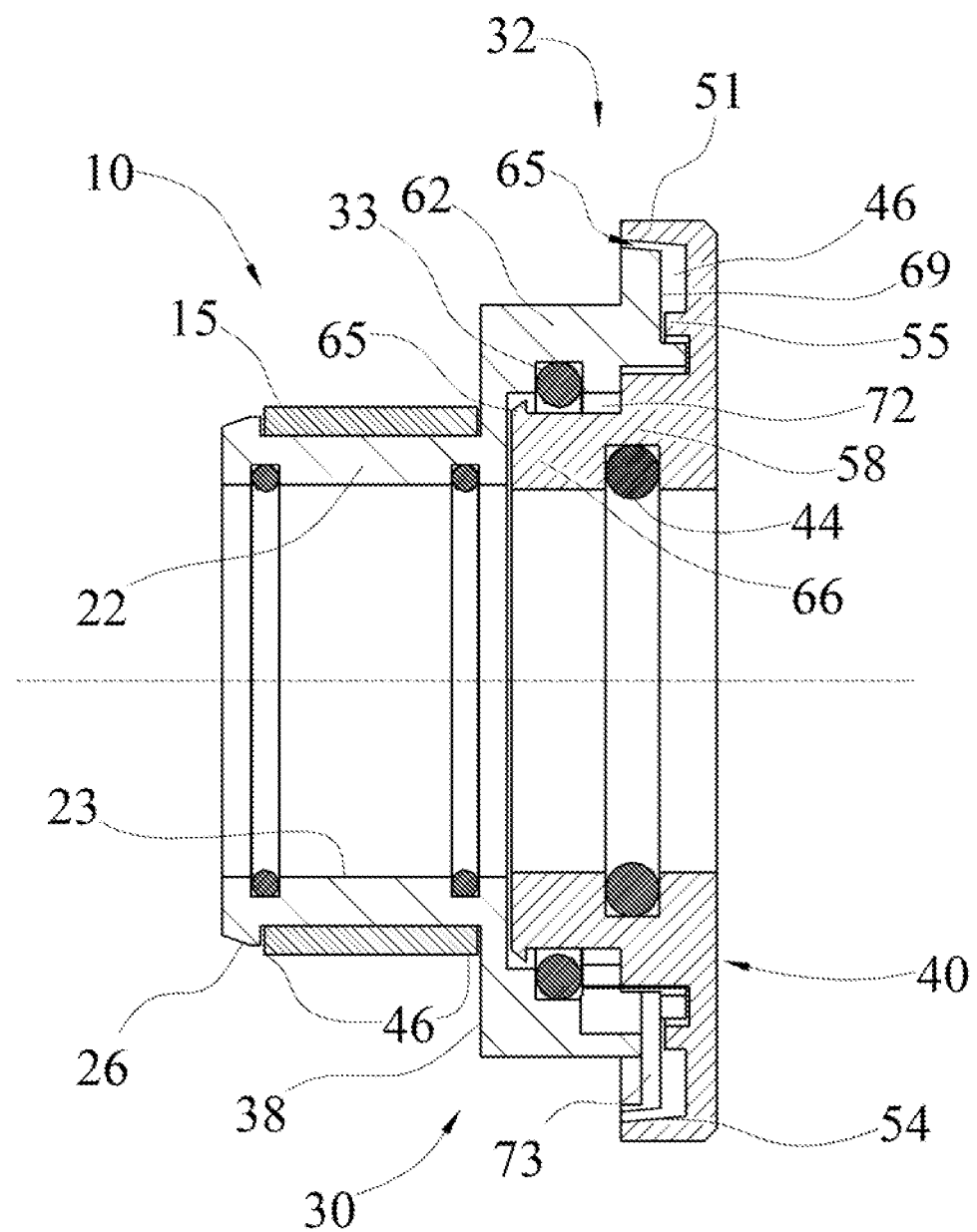
FIG. 3 shows an elevation section view of the bearing seal of FIG. 1, through line 2-2 of FIG. 1.

FIG. 3 shows the rotor 40 and the stator 32 having confronting faces that form a labyrinth seal. Non-limiting examples of the confronting faces and the labyrinth interface pathway defined therebetween are described in U.S. Pat. No. 9,587,743, issued Mar. 7, 2017, the disclosure of which is incorporated by reference in its entirety. As shown in FIG. 3, the projections and grooves of the confronting rotor 40 and stator 32 define a first, outer exclusion chamber 46 that typically extends radially, defined by the distal projection 51 and the intermediate projection 55 of the rotor 40, which are rotating during dynamic operation, and the radial surface 69 of the stator 32, which is stationary. The outer exclusion chamber 46 is in fluid communication with the tapered interface passage 65 and the first radially-extending interface passage of intermediate projection 55. During operation, any liquid contaminant might pass through the tapered, distal interface passage 65 and into the outer exclusion chamber 46, will be struck and flung outward radially by the rotating intermediate projection 55 of the rotor 40, flinging the contaminant radially outward and out through the interface passage 65.

A second, inner exclusion chamber 72 is defined by the body 62 of the stator 32, which is stationary during dynamic operation, and the projection 66 and main body portion 58 of the rotor 40, which are rotating. The second, inner exclusion chamber 72 is in fluid communication with the first and second interface passages.

A bottom portion of the forward portion of the stator body 62 of the stator 32 is removed by well-known means to provide a contaminant drain 73, as shown in FIG. 3. Any contaminant liquid, such as washing water dispensed from high-pressure hoses during routine cleanup, or other liquids or vapors in the environment that pass through or to the interface passages, and collects in the annular outer chamber 46 and inner chamber 72, passes downward and drains from the drain 73. The annular distal projection 51 that extends entirely around the circumference of the rotor, as shown in FIG. 3, has a downwardly-sloping surface 54 at the bottom that helps to drain contaminant liquid out from the seal. The interface gaps are preferably machined to a high tolerance and narrowest spacing possible to minimize fluid migration.

We claim:

1. A pillow block bearing seal configured for mounting into a shaft opening in a wall of a bearing housing, defined by a pair of axially-spaced annular ribs separated by a groove, and for sealing the shaft opening around the shaft, the bearing seal comprising:
   (a) a stator assembly including: a cylindrical base having an axial length and an outer surface consisting of a cylindrical outer surface, and configured to accept the shaft passing there through; and a stator extending annularly from a first axial end of the cylindrical base, the stator including an axially outward-facing surface;
   (b) a rotor configured to attach to and rotate with a rotatable shaft, the rotor having an axially inward-facing surface that confronts the axially outward-facing surface of the stator to define labyrinth interface passage; and
   (c) a resilient cylindrical sleeve having an axial length from a first end to a second end, and an outer surface consisting of a cylindrical outer surface extending from the first end to the second end, and an inner surface fixed to the cylindrical outer surface of the cylindrical base, that contacts with the pair of annular ribs of the bearing housing, for stabilizing the alignment of the center line of the shaft with the bearing housing.

2. The bearing seal of claim 1, wherein the resilient cylindrical sleeve has a radial thickness, a cylindrical outer surface, and an inner surface having an inner diameter that is the same or smaller than the outer diameter of the cylindrical outer surface of the cylindrical base, wherein the resilient cylindrical sleeve is fixed to a cylindrical outer surface of the cylindrical base, and is configured for contact with the pair of annular ribs of the bearing housing, for stabilizing the alignment of the center line of the rotatable shaft with the bearing housing.

3. The bearing seal of claim 2, further including at least two alignment elements axially displaced and positioned radially within inner annular grooves of the cylindrical base, and configured to have a zero contact clearance with the shaft.

4. The bearing seal of claim 3, wherein the alignment elements are made of a material having low coefficient of friction, wherein the alignment elements conform to the surface of the shaft by being worn away by the rotation of the shaft, and is preferably made of Teflon®.

5. The bearing seal of claim 4, wherein the stator is pinned to the bearing housing.

6. The bearing seal of claim 5, wherein the stator has a first pinning bore, the bearing housing has a second pinning bore, and further including an elongated pin disposed within both of the first pinning bore and second pinning bore.

7. The bearing seal of claim 6, wherein the first pinning bore is formed axially in a rearwardly-facing radial wall of the stator, and the second pinning bore is formed axially in a forwardly-facing radial portion of the wall of the bearing housing.

8. The bearing seal of claim 7, wherein the first pinning bore is formed radially in the cylindrical base of the stator, and the second pinning bore is formed radially into the wall the bearing housing, and aligned radially with the groove between the pair of annular ribs.

9. The bearing seal of claim 8, wherein the rotor and stator assembly have a split configuration.

10. The bearing seal of claim 2, wherein the stator is pinned to the bearing housing.

11. The bearing seal of claim 2, wherein the stator has a first pinning bore, the bearing housing has a second pinning bore, and further including an elongated pin disposed within both of the first pinning bore and second pinning bore.

12. The bearing seal of claim 11, wherein the first pinning bore is formed axially in a rearwardly-facing radial wall of the stator, and the second pinning bore is formed axially in a forwardly-facing radial portion of the wall of the bearing housing.

13. The bearing seal of claim 11, wherein the first pinning bore is formed radially in the cylindrical base of the stator, and the second pinning bore is formed radially into the wall the bearing housing, and aligned radially with the groove between the pair of annular ribs.

14. The bearing seal of claim 11, wherein the rotor and stator assembly have a split configuration.

15. A sealed bearing housing for a rotating shaft, including:
 (a) a bearing housing having a wall with a shaft opening defined by a pair of axially-spaced annular ribs separated by a groove, a shaft supported by one or more bearings in the bearing housing; and
 (b) a bearing seal, comprising:
  i) a stator assembly mounting into the shaft opening in the wall of the bearing housing, the stator assembly including a cylindrical base having an outer surface consisting of a cylindrical outer surface and an axial length that is configured to accept the shaft passing there through, and a stator extending annularly from a first axial end of the cylindrical base, the stator including an axially outward-facing surface;
  ii) a rotor configured to attach to and rotate with a rotatable shaft, the rotor having an axially inward-facing surface that confronts the axially outward-facing surface of the stator when the rotor is fixed to the stator, to provide a labyrinth seal having a labyrinth interface passage; and
  iii) a resilient cylindrical sleeve having a radial thickness, an outer surface consisting of a cylindrical outer surface, and an inner surface consisting of a cylindrical inner surface, the inner surface having an inner diameter that is the same or smaller than the outer diameter of the cylindrical outer surface of the cylindrical base, the cylindrical inner surface of the resilient cylindrical sleeve being fixed to the cylindrical outer surface of the cylindrical base, that contacts with the pair of annular ribs of the bearing housing, for stabilizing the alignment of the center line of the shaft with the bearing housing.

16. The sealed bearing housing of claim 15, wherein the bearing housing is a split self-contained bearing housing that includes a split wall and a means for securing together the split housing members, and each split wall having a semi-circular portion of each of the pair of axially-spaced annular ribs of the bearing housing.

17. The sealed bearing housing of claim 16, wherein the stator has a first pinning bore, the bearing housing has a second pinning bore, and further including an elongated pin disposed within both of the first pinning bore and second pinning bore.

18. The sealed bearing housing of claim 17, wherein the first pinning bore is formed axially in a rearwardly-facing radial wall of the stator, and the second pinning bore is formed axially in a forwardly-facing radial portion of the wall of the bearing housing.

19. The sealed bearing housing of claim 17, wherein the first pinning bore is formed radially in the cylindrical base of the stator, and the second pinning bore is formed radially into the wall the bearing housing, and aligned radially with the groove between the pair of annular ribs.

20. The sealed bearing housing of claim 15, wherein the rotor and stator assembly have a split configuration.

* * * * *